United States Patent [19]
Nagai et al.

[11] Patent Number: 4,837,646
[45] Date of Patent: Jun. 6, 1989

[54] TAPE GUIDE APPARATUS FOR HELICALLY WOUND TAPE

[75] Inventors: Kyuichiro Nagai, Katsuta; Nobuyuki Kaku; Kenji Ogiro, both of Yokohama, all of Japan

[73] Assignee: Hitachi, Ltd., Tokyo, Japan

[21] Appl. No.: 249,246

[22] Filed: Sep. 26, 1988

Related U.S. Application Data

[63] Continuation of Ser. No. 925,908, Nov. 3, 1986, abandoned, which is a continuation of Ser. No. 456,297, Jan. 6, 1983, abandoned.

[30] Foreign Application Priority Data

Jan. 13, 1982 [JP] Japan .................................. 57-2691

[51] Int. Cl.$^4$ ........................ G11B 5/027; G11B 15/60
[52] U.S. Cl. .................................. 360/85; 360/130.2; 360/130.23; 360/130.22
[58] Field of Search .................. 360/71, 84, 85, 95, 360/130.21, 130.22, 130.23, 130.24; 226/196, 197, 189; 242/193, 194

[56] References Cited

U.S. PATENT DOCUMENTS

| | | | |
|---|---|---|---|
| 3,474,195 | 10/1969 | Wada ............................... | 360/84 |
| 3,681,539 | 8/1972 | Eibensteiner .............. | 360/130.23 X |
| 3,939,494 | 2/1976 | Okuda ......................... | 360/130.24 X |
| 4,110,805 | 8/1978 | Oishi ................................ | 360/130.21 |
| 4,115,825 | 9/1978 | Hayashi et al. ....................... | 360/95 |
| 4,258,399 | 3/1981 | Iijima et al. ............................. | 360/85 |
| 4,274,118 | 6/1981 | Mangold .................... | 360/130.24 X |
| 4,348,706 | 9/1982 | Videc ............................. | 360/130.24 |
| 4,379,517 | 4/1983 | Miyakawa et al. ................. | 226/189 |

FOREIGN PATENT DOCUMENTS

| | | | |
|---|---|---|---|
| 0022298 | 1/1981 | European Pat. Off. . | |
| 0104822 | 4/1984 | European Pat. Off. ....... | 360/130.24 |
| 3040016 | 5/1981 | Fed. Rep. of Germany . | |
| 52-58903 | 5/1977 | Japan ................. | 360/130.23 |
| 0185061 | 10/1984 | Japan ............................. | 360/130.21 |

*Primary Examiner*—Robert S. Tupper
*Assistant Examiner*—Andrew L. Sniezek
*Attorney, Agent, or Firm*—Antonelli, Terry & Wands

[57] ABSTRACT

A signal recording/reproducing apparatus for use with a tape cassette comprises a cylinder assembly having an outer peripheral surface. The cylinder assembly has mounted thereon heads for recording and reproducing a signal on and from a magnetic tape in the tape cassette, respectively, and a lead formed on the outer peripheral surface of the cylinder assembly so as to helically extend, to define a running path of the magnetic tape on the outer peripheral surface of the cylinder assembly. A pair guides guide the tape so that the tape is helically wound over a predetermined angular extent along the lead upon the recording/reproducing of the signal. The pair of tape guides are located and oriented in their predetermined positions such that the tape guides impart a force to the tape to press the tape onto the lead during recording and reproduction thereby to permit the tape to move along the lead.

11 Claims, 5 Drawing Sheets

TAPE GUIDE APPARATUS FOR HELICALLY WOUND TAPE

This application is a continuation of application Ser. No. 925,908, filed Nov. 3, 1986, which is a continuation of parent application Ser. No. 456,297, filed Jan. 6, 1983, both of which are abandoned.

BACKGROUND OF THE INVENTION

1. Field of the Invention

The present invention relates to a signal recording/reproducing apparatus for use with a tape cassette.

2. Description of the Prior Art

A typical conventional apparatus of the kind referred to above comprises a cylinder assembly having an outer peripheral surface. The cylinder assembly includes heads for recording and reproducing signals on and from a magnetic tape, respectively, and a lead formed on the outer peripheral surface of the cylinder assembly so as to helically extend, to define a running path of the tape on the outer peripheral surface of the cylinder assembly. A pair of tape guides guide the tape such that the tape is helically wound around the outer peripheral surface of the cylinder assembly over a predetermined angular extent along the lead during the recording and reproduction of the signal. During the recording and reproduction, one of the tape guides is positioned at the approaching side in which the tape approaches the cylinder assembly, while the other tape guide is positioned at the leaving side of the cylinder assembly in which the tape runs away from the cylinder assembly.

As disclosed in a literature "National Technical Report" Vol. 25, No. 1, February, 1979, pp 61–69, the respective positions and orientations of the tape guides with respect to the cylinder assembly are determined through a geometrical design taking into account only such a static condition as to permit the tape to run along the lead without any twist. The geometrical design is defined as satisfying such geometrical conditions that a portion of the tape extending between the one tape guide and the cylinder assembly lies in a plane while a portion of the tape extending between the other tape guide and the cylinder assembly lies in a plane.

However, when the tape actually runs along the path determined through the geometrical design, no restraining force is applied to the tape. Therefore, if an external disturbance such as force exerted on the tape due to the contact of the head with the tape and vibration of tape due to a certain cause is applied to the tape, the tape tends to move away from the lead to make it difficult to attain the desired track tracing characteristics.

SUMMARY OF THE INVENTION

An object of the present invention is to provide a signal recording/reproducing apparatus for use with a tape cassette, which ensures that the tape runs along and in contact with the lead thereby to attain the desired track tracing performance.

According to the invention, there is provided a signal recording/reproducing apparatus for use with a tape cassette, comprising: a cylinder assembly having an outer peripheral surface, the cylinder assembly having mounted thereon heads for recording and reproducing a signal on and from a magnetic tape within the tape cassette, respectively, and a lead formed on the outer peripheral surface of the cylinder assembly so as to helically extend, to define a running path of the tape on the outer peripheral surface of the cylinder assembly; a pair of tape guide means for guiding the tape such that the tape is helically wound around the outer peripheral surface of the cylinder assembly over a predetermined angular extent along the lead upon the recording/reproducing of the signal, one of the tape guide means being disposed at an approaching side of the cylinder assembly in which the tape approaches the cylinder assembly while the other tape guide means is disposed at a leaving side in which the tape runs away from the cylinder assembly; and the pair of tape guide means being located and oriented in their predetermined positions with respect to the cylinder assembly to impart a force to the tape to press the same against the lead to enable the tape to run along the lead.

Other objects, features and advantages of the invention will become clear from the following description of the preferred embodiments taken in conjunction with the accompanying drawings.

DESCRIPTION OF THE PREFERRED EMBODIMENTS

Figure 1:
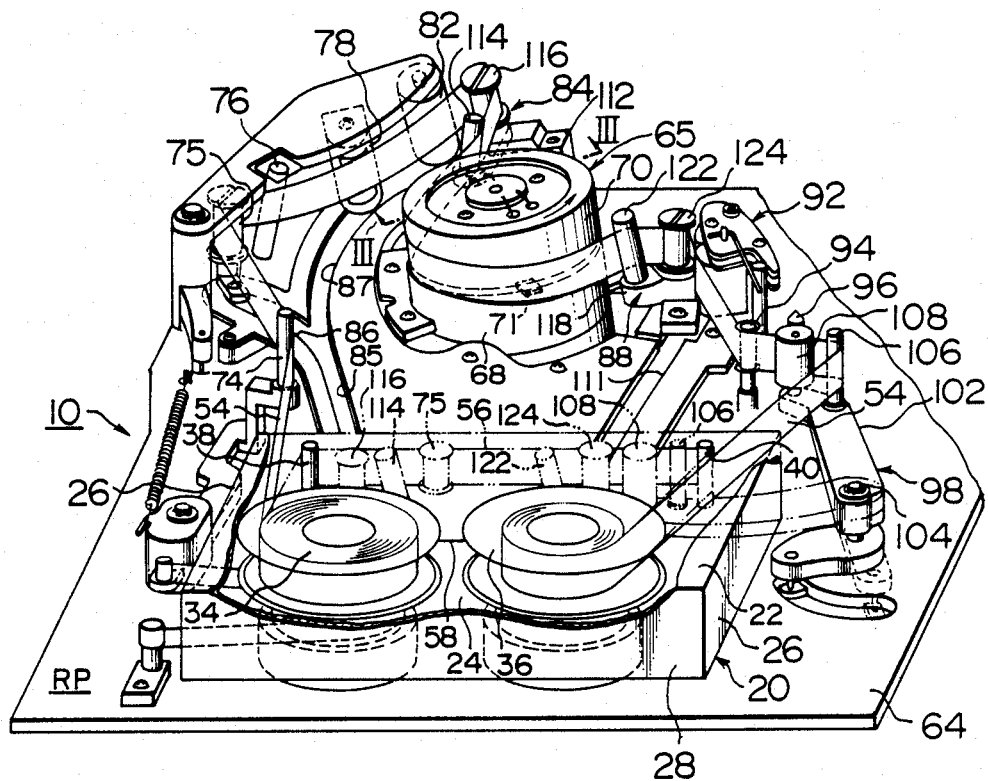
FIG. 1 is a fragmental schematic perspective view of non-parallel-loading type signal recording/reproducing apparatus in accordance with an embodiment of the invention, wherein a pair of tape guides in the loading position are shown by solid lines while the tape guides in the unloading position are shown by phantom lines.
Figure 2:
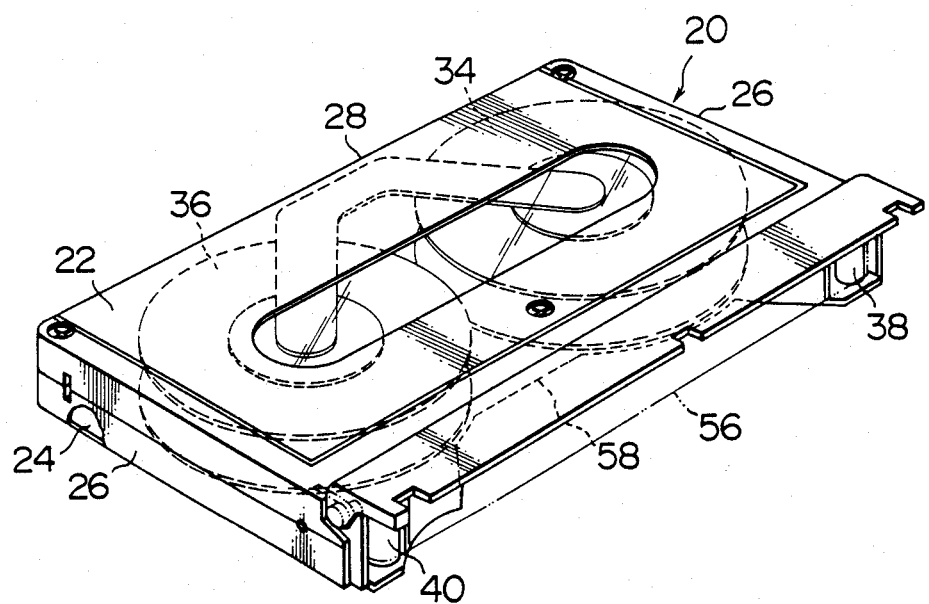
FIG. 2 is a perspective view of a tape cassette.

Referring to FIG. 1, there is illustrated non-parallel-loading type signal recording/reproducing apparatus generally designated by the reference numeral 10 in accordance with an embodiment of the invention, for use in combination with a tape cassette which is generally designated by a reference numeral 20. As will be clearly seen from FIG. 2, the tape cassette 20 has parallel top and bottom walls 22 and 24, a pair of side walls 26 extending in parallel with each other, a rear wall 28 and an open front side. A supply reel 34 and a take-up reel 36 are rotatably mounted within the casing of the tape cassette 20. A guide post 38 has an axis which is perpendicular to the top wall 22 and the bottom wall 24 of the casing, and is positioned adjacent to one of a pair of side walls 26, while another guide post 40 corresponding to the guide post 38 is disposed adjacent to the other side wall 26. A thin magnetic tape 54 of a thickness of, for example 10 to 20 μm has ends thereof secured to the supply reel 34 and the take-up reel 36, respectively. With the apparatus 10 in the unloading state as will be explained later, the tape 54 is guided by the guide posts 38 and 40 and has a portion 56 shown by phantom lines extending substantially linearly between these guide posts 38 and 40. As will be seen from FIG. 2, a notch 58 is formed in the portion of the bottom wall 24 of the casing adjacent to the open front side of the same.

Figure 3:
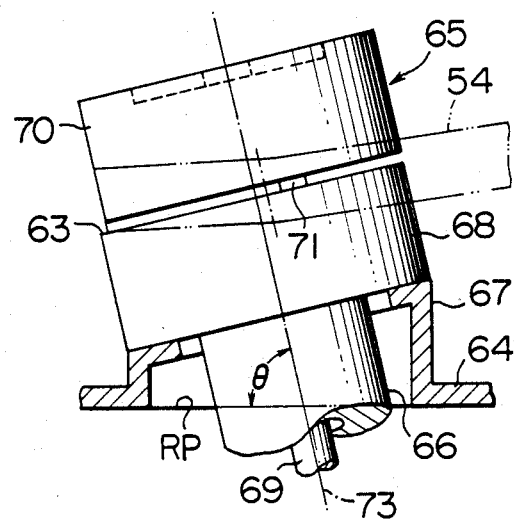
FIG. 3 is a sectional view taken along the line III—III of FIG. 1 with the tape shown by phantom lines.

The apparatus 10 has a base frame 64 and a cylinder assembly 65. As will be seen from FIG. 3, the cylinder assembly 65 comprises a fixed hollow shaft 66 extending through the base frame 64, a lower fixed cylinder 68 fixedly mounted on the hollow cylinder 66 and carried by an annular projection 67 formed on the base frame 64, a rotatable shaft 69 extending through the hollow shaft 66 in concentric relation thereto, and an upper rotatable cylinder 70 mounted on the rotatable shaft 69 for rotation therewith. The upper rotatable cylinder 70 is spaced axially from the lower fixed cylinder 68 to define a circumferential gap therebetween. A pair of heads 71 diametrically opposed to each other are disposed in the circumferential gap defined between the upper and lower cylinders and are mounted on the upper rotatable cylinder 70 for rotation therewith relative to the lower fixed cylinder 68 thereby to record and reproduce signals on and from a magnetic tape 54, respectively. An axis 73 of the cylinder assembly 75 is, as shown in FIG. 3, inclined at a predetermined angle θ to a reference plane RP which is perpendicular to the rotational axes of the supply reel 34 and the take-up reel 36 in the cassete 20. The lower fixed cylinder 68 has a lead 63 formed on the outer peripheral surface thereof and extending in a helical form at least over an angular extent of 180° so as to define a running path of the tape on the outer peripheral surface of the cylinder assembly 65.

Disposed at an approaching side of the cylinder assembly, in which the tape runs to approach the cylinder assembly, are a tension pin 74 abutting against the tape 54 to detect the tension in the tape in order to control the tension applied to the tape during the running thereof, a movable and rotatable roller 75 which limits the height of path of running of the tape 54, a stationary inclined guide pin 76 for guiding the tape 54 during running, an erasing head 78 capable of erasing signals over the entire width of the tape 54, an impedance roller 82 capable of absorbing and attenuating the vibration of the tape 54 during running, and a movable tape guide 84. The height limiting roller 75 is movable along a common slot 85 and a branch slot 86 between a loading position illustrated by solid line in FIG. 1 and an unloading position shown by phantom line therein. Similarly, the tape guide 84 is movable along a slot 87 between a loading position shown by solid lines and an unloading position shown by phantom line in FIG. 1. In the unloading position, the roller 75 and the tape guide 84 are located in the notch 58 formed in the cassette 20 so that the portion 56 of the tape 54 takes a position between the roller 75 and tape guide 84 and the cylinder assembly 65. The pin 76 is stationarily mounted on the base frame 64. The erasing head 78 and the impedance roller 82 are rotatably supported by the base frame 64.

Located at a leaving side of the cylinder assembly where the tape 54 runs away from the cylinder assembly 65 are a movable tape guide 88, head assembly 92, a rotatably fixed roller 94 for limiting the height of running path of the tape, a fixed capstan 96, and a pinch roller 98. The head assembly 92 is supported by the base frame 64 so as to be adjustable in position and inclination and includes an erasing head exclusive for a voice signal track and operative during the recording of the voice signal, a voice signal recording/reproduction magnetic head, and a control head for controlling the tape running speed and the phase of the tape 54. The pinch roller assembly 98 includes a bracket 102 pivotable around a pivot pin 104 fixed to the base frame 64, a pin 106 fixed to the bracket 102 and a pinch roller 108 rotatably mounted on the bracket 102, and is movable between a loading position shown by solid line and the unloading position shown by phantom line in FIG. 1. In the unloading position, the pin 106 and the pinch roller 108 are positioned within the notch 58 in the cassette 20 so that the portion 56 of the tape 54 takes a position between the pin 106 and pinch roller 108 and the cylinder assembly 65. When the pinch roller assembly is in the loading position, the pinch roller 108 drives the tape 54 at a constant speed in cooperation with the capstan 96 which is connected to a fly-wheel (not shown) for rotation therewith. The tape guide 88 is movable along a slot 111 between the loading position shown by solid line in FIG. 1 and the unloading position shown by phantom line in FIG. 1. The tape guide 88, when taking the unloading position, is positioned within the notch 58 in the tape cassette 20 so that the portion 56 of the tape 54 takes a position between the tape guide and the cylinder assembly 65.

The tape guide 88 comprises a mount 112, a non-rotatable cylindrical guide element or guide pin 114 fixed to the mount, and a cylindrical guide element or guide roller 116 rotatably mounted on the mount 112. Similarly, the tape guide 88 comprises a mount 118, a non-rotatable guide element or guide pin 122 fixed to the mount, and a cylindrical guide element or guide roller 124 rotatably supported by the mount 118. When the tape guides 84 and 88 are moved from the unloading position to the loading position, the tape 54 is withdrawn out of the cassette 20 by the tape guides 84 and 88. Meanwhile the tape guide 84 is gradually displaced away from the upper surface of the base frame 64 as it approaches the cylinder assembly along the slots 85 and 87. In contrast, the tape guide 88 is moved in parallel relation to the upper surface of the base frame 64 along the slot 111. Thus, in the loading position, the tape guide 84 at the approaching side takes a higher elevation than the tape guide 88 of the leaving side. The tape guides 84 and 88, when taking the loading position, cooperate with each other to guide the tape 54 so that the tape 54 is helically wound around the cylinders 68, 70 over a predetermined angular extent of, for example, more than 180° along the lead 63. When the tape guides 84 and 88 take the loading position, the tape guide 84 at the approaching side takes an elevation higher than that of the tape guide 88 at the leaving side as explained previously. More specifically, in the loading position, the elevation of the tape-widthwise center of a contact line between the guide pin 114 and a portion of the tape 54 extending between the cylinder assembly 65 and the guide pin 114 of the tape guide 84 at the approaching side, with respect to the reference plane RP is greater than the elevation of the tape-widthwise center of a contact line between the guide pin 122 and a portion of the tape 54 extending between the cylinder assembly 65 and the guide pin 122 of the tape guide 88 at the leaving side, with respect to the reference plane RP. The movement of the tape guides 84 and 88 between the loading position and the unloading position may be effected by a known mechanism.

Figure 4:
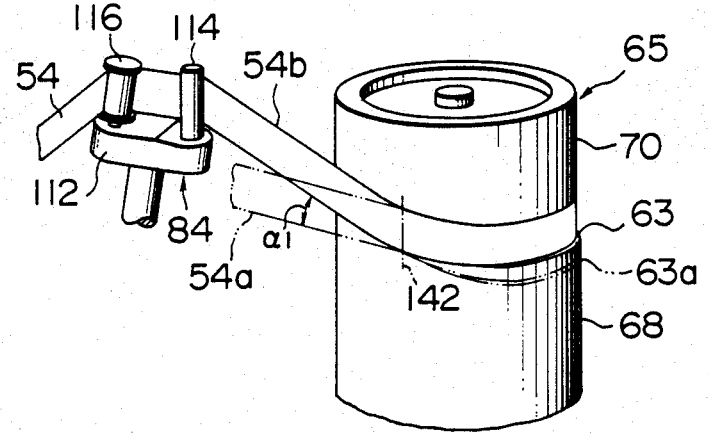
FIG. 4 is a fragmental schematic perspective view of the apparatus shown in FIG. 1, illustrating the positional relationship between the tape guide at the approaching side and the cylinder assembly.
Figure 5:
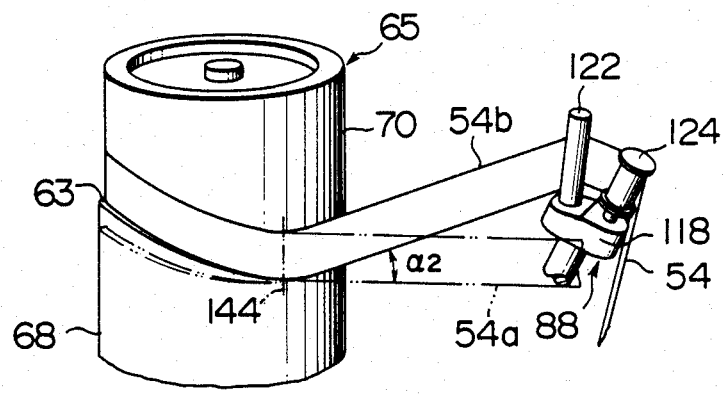
FIG. 5 is a fragmental schematic perspective view of the apparatus shown in FIG. 1, illustrating the positional relationship between the tape guide at the leaving side and the cylinder assembly.

In FIGS. 4 and 5, a tape running path 54a shown by phantom line indicates a tape running path based on a geometrical design of actual lead 63. The actual tape running path 54b between the cylinder assembly 65 and the tape guides 84, 88 in accordance with the present invention, however, does not coincide with the tape running path 54a based on the geometrical design of the actual lead 63. More particularly, the actual tape running path 54b forms an angle of incidence $\alpha_1$ with respect to the tape running path 54a at a generating line 142 of the cylinder assembly at which the contact of the tape 54 with the outer peripheral surface of the cylinder assembly 65 at the approaching side is initiated. At the leaving side of the cylinder assembly, the actual tape running path 54b forms an angle of incidence $\alpha_2$ relative to the tape running path 54a at the generating line 144 of the cylinder assembly 65 at which the contact of the tape 54 with the outer peripheral surface of the cylinder assembly 65 is terminated. In other words, the tape guides 84 and 88, particularly the guide pins 114 and 122 of these tape guides, are located and orientated in their predetermined positions with respect to the cylinder assembly 65 such that the tape 54 forms an angle of incidence $\alpha_1$ to the lead 63 at the generating line 142 and that the tape 54 forms an angle of incidence $\alpha_2$ to the lead 63 at the generating line 144.

As shown in FIGS. 4 and 5, at least the guide pins 114 and 122 contact the tape over the entire widthwise direction thereof during the running of the tape to impart the force thereto.

The lead 63a based on a geometrical design corresponding to the actual tape running path 54b is spaced downwardly from the actual lead 63 as shown by phantom line in FIGS. 4 and 5. The tape 54 running along the actual tape running path 54b tends to move towards the lead 63a which conforms in geometrical design with the actual tape running path 54b. However, the actual lead 63 prevents the tendency of movement of the tape 54 towards the lead 63a. Thus, the tape is pressed against the actual lead 63 with a certain pressure and, runs stably along the actual lead 63.

The optimum values of the angles of incidence $\alpha_1$ and $\alpha_2$ depend on various factors such as the width and thickness of the magnetic tape 54 used, diameter of the cylinder assembly 75 and the angle $\theta$ of inclination of the cylinder assembly with respect to the reference plane RP, spans between the cylinder assembly 65 and the guide pins 114, 122 of the tape guides 84, 88, and are determined through experiments for individual apparatus.

Figure 6:
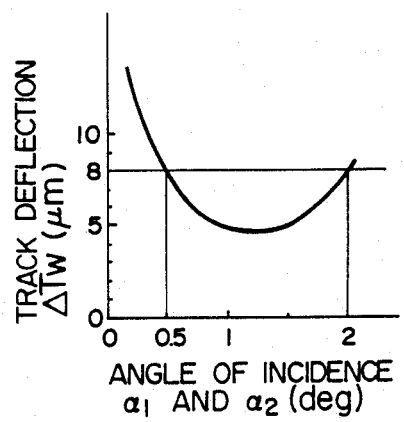
FIG. 6 is a graph obtained by experiments, showing the relationship between the angle of incidence of the tape with respect to the lead on the cylinder and the track deflection.

FIG. 6 shows the result of the an experiment which was conducted to obtain the optimum values of the angles of incidence $\alpha_1$ and $\alpha_2$ in an apparatus having a cylinder assembly of 40 mm dia. and inclination angle $\theta$ of 9.5° and a span between the cylinder assembly and the guide pins 114, 122 of about 10 mm, when the apparatus is used in combination with a tape of 6.25 mm wide and 14 to 20 μm thick. FIG. 6 shows also the relationship between the angles of incidence $\alpha_1$ and $\alpha_2$ and the minimum value ΔTw of the track deflection obtained after an adjustment of the tape running position conducted in the tape running path forming these angles of incidence. The track deflection is usable as an index of the linearity of the recorded track pattern. It is essential that the minimum value ΔTw of the track deflection is not greater than about 8 μm, and the optimum values of the angles of incidence $\alpha_1$ and $\alpha_2$ range between approximately 0.5° and 2.0°. Accordingly, the positions and orientations of the guide pins 114 and 122 at the approaching side and leaving side with respect to the cylinder assembly 65 are determined such that the angles of incidence $\alpha_1$ and $\alpha_2$ become a range between 0.5° and 2.0°.

Figure 7:
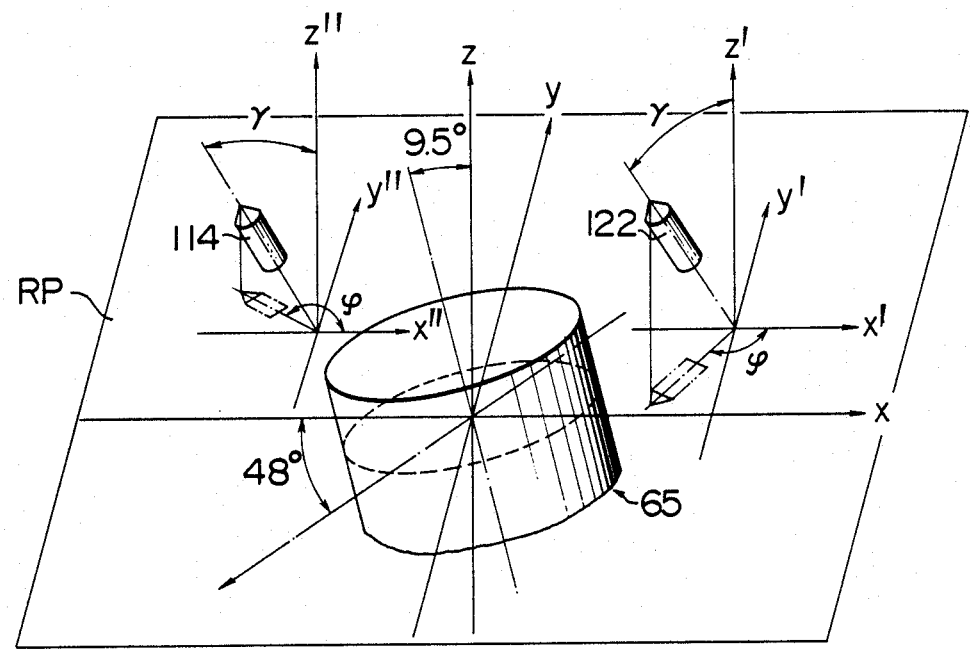
FIG. 7 is a fragmental schematic perspective view of the apparatus shown in FIG. 1, showing the inclination angle and inclination direction of non-rotatable guide pins.

FIG. 7 shows by way of example, inclination angles of the pins 114, 122 and the cylinder assembly 65 of the apparatus shown in FIG. 1. The inclination angle $\theta$ of the cylinder assembly 65 with respect to the reference plane RP is 9.5°, and the direction of inclination is 48° in terms of projection angle of the cylinder assembly on the reference plane RP as shown in FIG. 7. The inclination angles $\gamma$ of the guide pins at the approaching and leaving sides relative to the reference plane RP, based on the geometrical design of the lead angle (about 4°) of the actual lead 63 are 9.2° and 16.5°, respectively. In contrast, in the embodiment of the invention in which the angles of incidence $\alpha_1$ and $\alpha_2$ are 0.5°, the inclination angle $\gamma$ of the guide pin 114 at the approaching side and the inclination angle $\gamma$ of the guide pin 122 at the leaving side are 8.4° and 19.2°, respectively. The inclination angle of each guide pin can be expressed in terms of the projection angle $\zeta$ of the guide pin of the reference plane RP. The projection angles $\zeta$ of the guide pins at the approaching and leaving sides based on the geometrical design of the lead angle of the actual lead 63 are 122.7° and 88.5°, respectively. In contrast, in the described embodiment of the invention, the projection angle $\zeta$ of the guide pin 114 at the approaching side and the projection angle $\zeta$ of the guide pin 122 at the leaving side are 127.3° and 82.9°, respectively.

Figure 8:
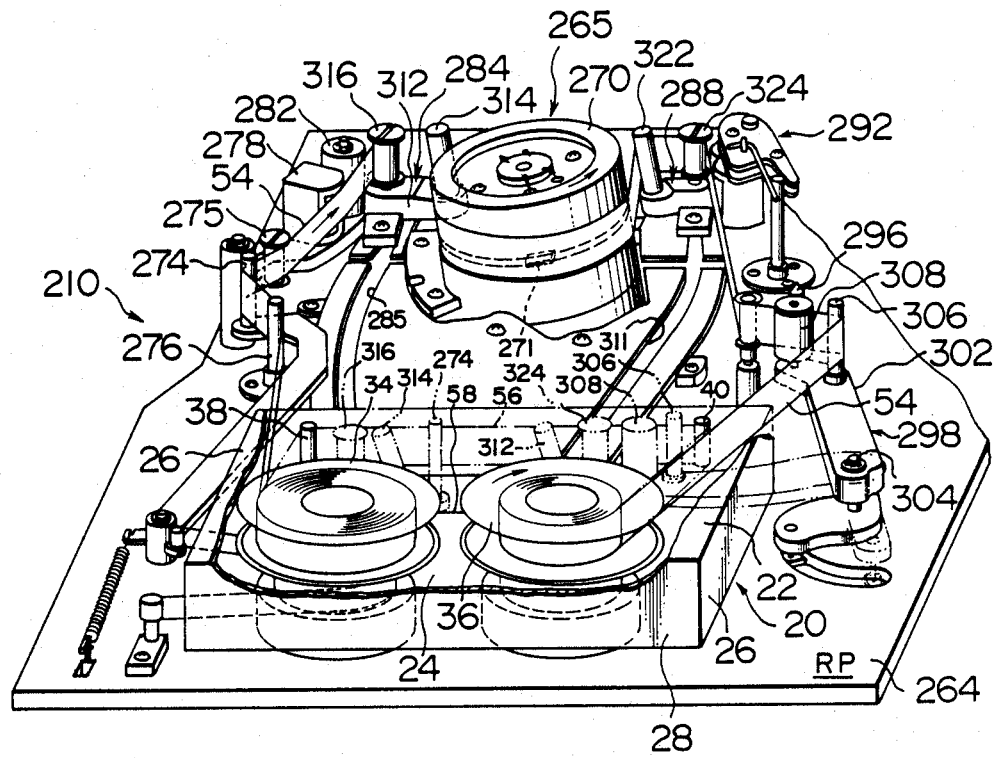
FIG. 8 is a fragmental schematic perspective view of parallel-loading type signal recording/reproducing apparatus in accordance with another embodiment of the invention.

FIG. 8 shows a parallel-loading type recording/reproducing apparatus in accordance with another embodiment of the invention. In FIG. 8, the same parts or members as those used in FIG. 1, except the parts in the cassette tape, are designated by reference numerals which are the sums of the reference numerals used in FIG. 1 and 200, respectively. Detailed description of such parts or members is omitted to avoid repetition of explanation.

The signal recording/reproducing apparatus 210 shown in FIG. 8 is of parallel-loading type in which both of the tape guides 284 and 288 at the approaching side and leaving side are parallel to the reference plane RP and are movable between the loading position and the unloading position. The apparatus 210 of this embodiment is discriminated from the apparatus 10 shown in FIG. 1 in that the stationary guide pin 276 on the approaching side has an axis perpendicular to the reference plane RP. Another point distinguishing the apparatus 210 of this embodiment from the apparatus 10 of the embodiment shown in FIG. 1 resides in that the tension pin 274 at the approaching side is movable between a loading position shown by solid line and an unloading position shown by phantom line shown in FIG. 8 and, when taking the unloading position, the tension pin 274 is located within the notch 58 in the cassette 20 so that the portion 56 of the tape 54 is positioned between the tension pin 274 and the cylinder assembly 265. The apparatus 210 of this embodiment is materially identical to the apparatus 10 of the embodiment shown in FIG. 1 in other respects.

The positional relationship between the tape guides and the cylinder assembly as shown in FIGS. 4 and 5 can equally be applied to the apparatus 210 shown in FIG. 8. This means that the values of the angles of incidence $\alpha_1$ and $\alpha_2$ shown in FIGS. 4, 5 and 6 can be adopted also in the apparatus 210 shown in FIG. 8.

Although the invention has been described through specific terms, the described embodiments are not exclusive and various changes and modifications may be imparted thereto without departing from the scope of the invention which is limited solely by the appended claims.

What is claimed is:

1. A signal recording/reproducing apparatus for use with a tape cassette, comprising:

a cylinder assembly having an outer peripheral surface said cylindrical assembly having mounted thereon heads for recording a signal on a magnetic tape within the tape cassette and for reproducing a signal from said magnetic tape, and an actual lead formed on the outer peripheral surface of said cylinder assembly; and a pair of tape guide means for guiding said tape such that said tape is helically wound around said outer peripheral surface of said cylinder assembly over a predetermined angular extent along said actual lead upon the recording and reproducing of the signal, one of said pair of tape guide means being disposed, upon recording of the signal on said tape and upon the reproducing of the signal from said tape, at an approaching side of said cylinder assembly in which said tape approaches said cylinder assembly, while the other of said pair of tape guide means is disposed, upon the recording of the signal on said tape and upon the reproducing of the signal from said tape, at a leaving side of said cylinder assembly in which the tape runs away from the cylinder assembly; and upon the recording and reproducing of the signal, said pair of tape guide means each including guide element means located and oriented with respect to said cylinder assembly for contacting said tape along an entire extent of said tape extending in a direction transverse to the running direction of said tape to impart a force to said tape so as to press one edge of said tape against said actual lead to enable said one edge of said tape to run along said actual lead, said pair of tape guide means being located and oriented to urge said tape to travel along a geometric path corresponding to an imaginary lead inclined relative to said actual lead and having a portion shifted downwardly from a portion of said actual lead along which said tape actually runs thereby imparting the force to said tape so as to enable said one edge of said tape to continuously run along said actual lead and to prevent said tape from moving away from said actual lead;

wherein upon the recording and reproducing of the signal, said pair of tape guide means are located and oriented in predetermined positions such that a portion of said tape extending between said guide element means of said one tape guide means and a generating line on said cylinder assembly at which the contact of said tape with said cylinder assembly is initiated at said approaching side forms a first predetermined angle of incidence with respect to a tape running path based on a geometric arrangement of the actual lead and, a portion of said tape extending between said guide element means of said other tape guide means and a generating line on said cylinder assembly at which the contact of said tape with said cylinder assembly is terminated forms a second predetermined angle of incidence together with said lead at said leaving side, said first and second predetermined angles of incidence ranging between about 0.5° and about 2.0°.

2. A signal recording/reproducing apparatus according to claim 1, wherein said pair of tape guide means are positioned adjacent said cylinder before recording or reproducing the signal.

3. A signal recording/reproducing apparatus according to claim 2, wherein said pair of tape guide means are movable between an unloading position apart from said cylinder assembly and a loading position adjacent to said cylinder assembly, said pair of tape guide means withdrawing said tape out of said tape cassette when they are moved from said unloading position to said loading position, said pair of tape guide means being located at said loading position during recording and reproducing of the signal.

4. A signal recording/reproducing apparatus according to claim 3, wherein each of said guide element means of said pair of tape guide means includes a non-rotatable guide element and a rotatable guide element.

5. A signal recording/reproducing apparatus according to claim 3, wherein said one and the other of said pair of tape guide means in said loading position have a difference in elevation therebetween with respect to a reference plane which is perpendicular to the axes of rotation of a supply reel and a take-up reel in said tape cassette.

6. A signal recording/reproducing apparatus according to claim 5, wherein said cylinder assembly includes a fixed cylinder and a rotatable cylinder which is rotatable relative to said fixed cylinder, said lead being formed on the outer peripheral surface of said fixed cylinder, said heads being mounted on said rotatable cylinder for rotation therewith.

7. A signal recording/reproducing apparatus according to claim 4, wherein said non-rotatable guide element and said rotatable guide element in each of said pair of tape guide means are movable between said loading position and said unloading position as a unit.

8. A signal recording/reproducing apparatus according to claim 1, wherein each of said guide element means of said pair of tape guide means comprises a non-resilient pin member extending in a direction of an axial direction of said cylinder assembly.

9. A signal recording/reproducing apparatus according to claim 1, wherein at least one of said guide element means of said pair of tape guide means comprises a member disposed adjacent to one of said approaching side of said cylinder assembly and said leaving side of said cylinder assembly and extending in a direction of an axial direction of said cylinder assembly.

10. A signal recording/reproducing apparatus according to claim 1, wherein each of said guide element means of said pair of tape guide means includes at least one one non-rotatable guide element and one rotatable guide element.

11. A signal recording/reproducing apparatus according to claim 1, wherein said pair of tape guide means form the only means for imparting a force to the opposite edge of said tape which does not run along said actual lead.

* * * * *